Aug. 30, 1932.  L. E. LA BRIE  1,875,029
BRAKE
Filed Oct. 19, 1928
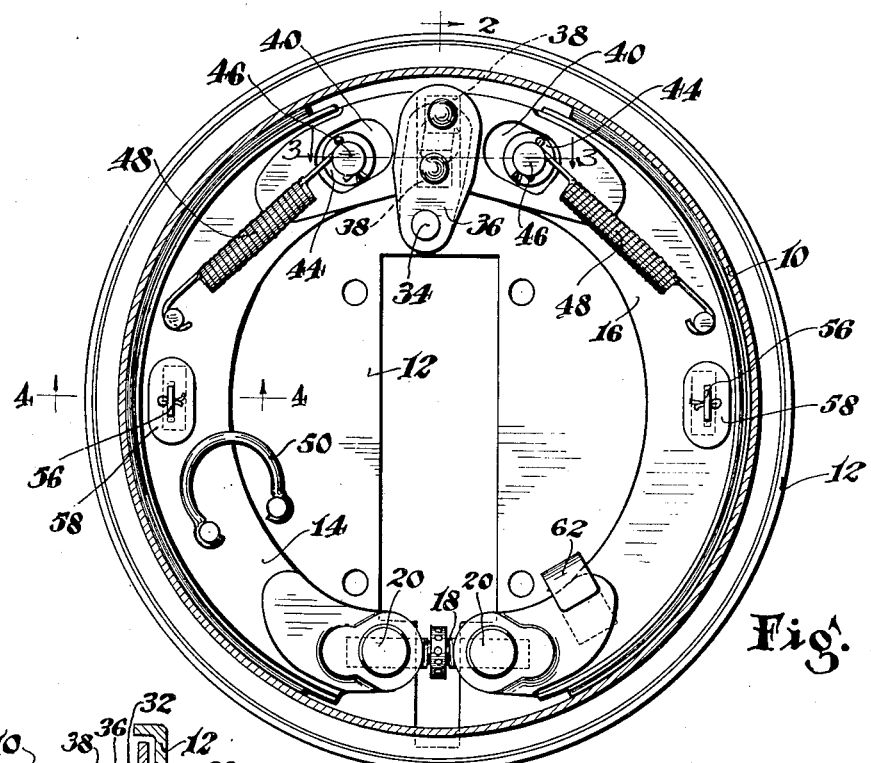
Fig. 1
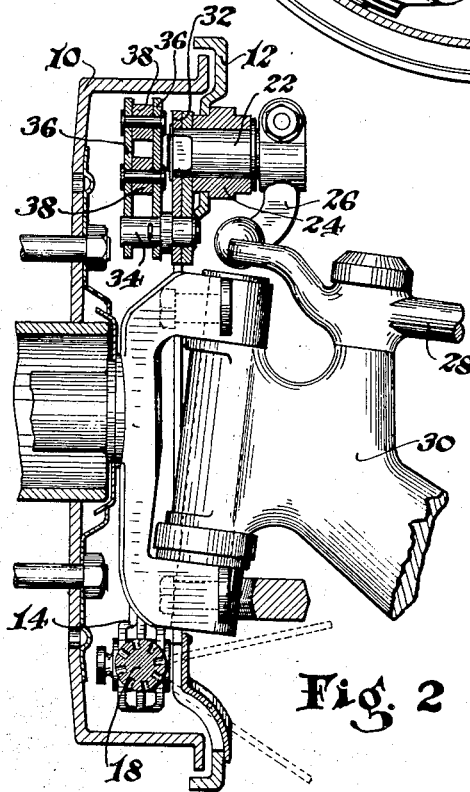
Fig. 2
Fig. 3
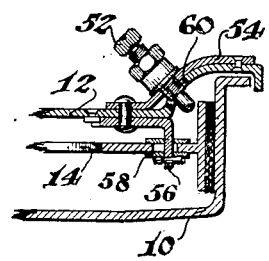
Fig. 4
INVENTOR.
Ludger E. La Brie
BY
ATTORNEY Patented Aug. 30, 1932

1,875,029

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE

Application filed October 19, 1928. Serial No. 313,412.

This invention relates to brakes, and is illustrated as embodied in an internal expanding brake for an automobile. An object of the invention is to minimize the friction in the brake anchorage, by a novel arrangement of rollers embracing the brake anchors and engaged by the shoes or their equivalents: In the illustrated arrangement, the brake is of the type having friction means anchoring at one end when the drum is turning in one direction and at the other end when the drum is turning in the other direction, the friction means preferably having elongated openings embracing the above-described rollers.

The above and other objects and features of the invention, including a novel positioning stop and spring arrangement, and other desirable details of construction, will be apparent from the following description of the illustrative embodiment shown in the accompanying drawing, in which:

Figure 1 is a vertical section through the brake just inside the head of the brake drum, and showing the brake shoes in side elevation;

Figure 2 is a transverse vertical section through the brake, on the line 2—2 of Figure 1;

Figure 3 is a partial section on the line 3—3 of Figure 1, showing the brake anchorage; and Figure 4 is a partial section on the line 4—4 of Figure 1, showing a novel steady rest.

The illustrated brake comprises a rotatable drum 10, at the open side of which is a support such as a backing plate 12, and within which is arranged the friction means of the brake. This friction means preferably includes two interchangeable floating shoes 14 and 16, faced with the usual friction lining, and connected by a right-and-left threaded adjusting member 18 threaded through transverse pivots 20 mounted in the ends of the shoes.

The shoes are forced apart to apply the brake by means such as a camshaft 22 journaled in a bracket 24 secured to the backing plate, and having an operating arm 26 terminating in a flattened spade portion in direct thrust engagement with the rounded end of an operating lever 28 fulcrumed on the axle 30, the end of lever 28 having its center of curvature in or immediately adjacent the swiveling axis of the wheel when the brake is applied. The inner end of shaft 22 is squared or flattened to key thereto a crank arm 32 having at its end a pivot 34 on which is mounted a floating cam lever including spaced plates 36 between which are pivoted a pair of thrust blocks (or rollers) 38 in direct thrust engagement with the ends of the shoes.

The shoes have a novel anchorage, being formed with anchor slots 40, the rounded ends of which may anchor against novel rollers 42 held by washers or the like 44 on the ends of anchor pins 46 mounted in the bracket 24 and carried by the backing plate. Washers 44 may be held in place by return springs 48 tensioned between the respective shoes and the ends of the corresponding anchor pin 46. If the brake drum is turning clockwise (car moving backward) when the brake is applied, shoe 14 anchores against its pin 46, while if the drum is turning counter-clockwise (car moving forward) shoe 16 is the one which anchors. For convenience of illustration, the brake is shown applied, but halfway between its two anchored positions.

The released or idle positions of the shoes may be determined by a U-shaped spring 50 tensioned between shoe 14 and the backing plate in such a manner as to urge the shoe away from the drum, and acting through the connection 18 on shoe 16. Spring 50 normally holds the shoes in positions determined by stops such as set-screws 52 (Figure 4) threaded through carrier plates 54 riveted or otherwise secured to the backing plate by means which may also be utilized to hold right-angled steady-rest members 56 extending through openings in the webs of the shoes and provided with web-embracing washers 58 held by means such as a cotter pin on the end of the steady-rest, the inner washer 58 resting against a shoulder formed on its member 56. Set-screws 52 extend through openings 60 in the backing plate, to positions where the shoes engage them when the brake is released. A U-shaped stamping 62 secured to the backing plate may be arranged to embrace the edge of the web of one or both shoes.

It is not my intention to claim in the present application any of the subject-matter of my prior applications Nos. 304,196, filed September 6, 1928, or 310,836 filed October 6, 1928, and on the other hand it is not my intention to limit the scope of the present invention to the particular embodiment described above, or otherwise than by the terms of the appended claims.

I claim:

1. A brake comprising a floating friction device having elongated openings in its opposite ends, in combination with anchor pins extending through said openings, and a single roller encircling each of said pins and arranged for anchoring engagement with the end of one of said openings.

2. A brake comprising a floating friction device, in combination with anchor pins adjacent the ends of said device, and a single roller encircling each of said pins and arranged for anchoring engagement with said device.

3. A brake comprising a floating friction device having elongated openings in its opposite ends, in combination with anchor pins extending through said openings, and a roller encircling at least one of said pins and arranged for anchoring engagement with the end of the corresponding opening.

4. A brake comprising a floating friction device, in combination with anchor pins adjacent the ends of said device, and a roller encircling at least one of said pins and arranged for anchoring engagement with the corresponding end of the friction device.

In testimony whereof, I have hereunto signed my name.

LUDGER E. LA BRIE.